(12) United States Patent
Wooldridge (10) Patent No.: US 11,204,001 B2
(45) Date of Patent: Dec. 21, 2021

(54) LIQUID COMBUSTION CONCENTRIC INJECTOR AND IGNITOR

(71) Applicant: Alan Lee Wooldridge, Longwood, FL (US)

(72) Inventor: Alan Lee Wooldridge, Longwood, FL (US)

( * ) Notice: Subject to any disclaimer, the term of this patent is extended or adjusted under 35 U.S.C. 154(b) by 0 days.

(21) Appl. No.: 16/385,061

(22) Filed: Apr. 16, 2019

(65) Prior Publication Data

US 2020/0332744 A1    Oct. 22, 2020

(51) Int. Cl.
*F02K 9/00*     (2006.01)
*F02K 9/52*     (2006.01)
*F02K 9/95*     (2006.01)

(52) U.S. Cl.
CPC . *F02K 9/52* (2013.01); *F02K 9/95* (2013.01)

(58) Field of Classification Search
CPC ..... F02K 9/52; F02K 9/95; F02K 9/26; F02K 9/58; F02K 9/42; B64G 1/401; F23R 3/14; F23D 2900/14021; F23D 2900/14701; F23C 2900/07001
See application file for complete search history.

(56) References Cited

U.S. PATENT DOCUMENTS

| 3,699,772 | A | | 10/1972 | Elverum, Jr. | |
|---|---|---|---|---|---|
| 3,712,063 | A | * | 1/1973 | Andrysiak | F02K 9/58 60/265 |
| 4,206,594 | A | | 6/1980 | Elverum, Jr. | |
| 2018/0187631 | A1 | * | 7/2018 | Roz | F02K 9/95 |

* cited by examiner

*Primary Examiner* — Edwin Kang

(57) ABSTRACT

A rocket engine pintle injector with optimized spray pattern and with integrated igniter design for providing construction simplicity, throttleable thrust, stop/start/restart capability, optimized operational combustion, and improved ignition combustion stability. A user can start, throttle, and stop the engine by moving the internal concentric injector sleeve forward and backward to cause the fuel/oxidizer to spray out of the pintle head at different flow rates. The concentric igniter can be deployed so that the hot gasses or spark produced are radially projected into the spray of fuel/oxidizer surrounding the igniter. Once the fuel/oxidizer spray has been ignited, the igniter is stopped and retracted to protect the device from the heat of the combustion chamber and is ready for redeployment and restart of the engine as needed. Thus, a versatile, fully integrated, and scalable device can be used to start, throttle, stop, and restart any size rocket engine during any mission phase from launch to return from space.

1 Claim, 9 Drawing Sheets

--Prior Art--

Figure 7

--Prior Art--

LIQUID COMBUSTION CONCENTRIC INJECTOR AND IGNITOR

STATEMENT REGARDING PRIOR DISCLOSURES BY THE INVENTOR OR A JOINT INVENTOR

A provisional patent application was filed with the U.S. Patent Office on 19 Apr. 2018 (Application No. 62/659,974), LIQUID COMBUSTION CONCENTRIC INJECTOR ANO IGNITER, with Lee Wooldridge as sole inventor. The inventor refiled the present application of the same invention on 16 Apr. 2019. Prior to the initial provisional patent, in Feb. 14, 2017, some aspects of the invention were disclosed as part of a proposal for a Cooperative Agreement Notice between RocketStar, LLC, Lee Wooldridge/TrailBlazer Technologies, LLC, and NASA/George C. Marshall Space Flight Center (CAN No. NNM16567212C) that would have resulted in a test of the invention on NASA's rocket engine test stand. None of the other parties involved in this agreement contributed to the development of this invention and the non-Government parties had previously signed nondisclosure agreements. An inoperable dimensionally correct plastic model of a pintle injector without inclusion of the invention was produced for a fit check on NASA equipment, no prototype of this invention was produced and the CAN was discontinued. NASA has since filed statements to the U.S. Patent Office as to fact that NASA in no way contributed to the development of this invention. It is the sole invention of Alan Lee Wooldridge.

BACKGROUND OF THE INVENTION

The injector is one of the most sensitive and complex components of the cryogenic liquid fueled rocket engine. As a result, the performance data for rocket engines are practically always lower than the theoretically attainable values because of unpredictable imperfections in the mixing, combustion, and expansion of the propellants. Much like a typical shower nozzle, rocket engines commonly use a series of separate propellant injection orifices distributed across the surface of the headend of the combustion chamber to spray multiple jets of fuel and oxidizer intended to mix and burn during combustion. Unstable combustion, uneven propagation of the flame front, and difficulty achieving stable combustion throughout all flight regimes limits the performance of these engines to very specific applications allowing restricted throttling and limited, if any, restart capability. Truly flexible engines require stable, even propagation, and timely combustion of the oxidizer-fuel mixture to provide continued stable thrust and avoid detonative explosion and catastrophic damage across all power levels, ambient pressures, and gravitational vectors. In addition to deep throttling and restart ability, the most significant improvement in injector nozzle performance for engines is also expected to be achieved through the adaptation of nozzle exit pressures to the variations in ambient pressure across all atmospheric pressures encountered during the rocket's flight.

Figures 1, 2:
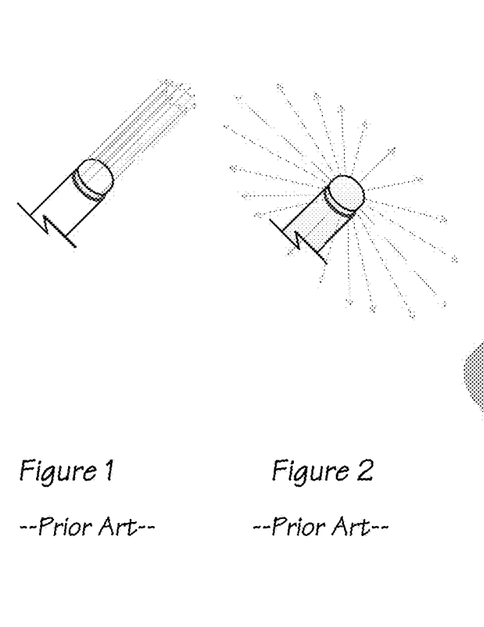
FIG. 1 is a simplified orthographic view of the cylindrical fuel spray produced by a pintle injector without the oxidizer impingement.
FIG. 2 is a simplified orthographic view of the radial oxidizer spray produced by a pintle injector without the fuel impingement.
Figure 3:
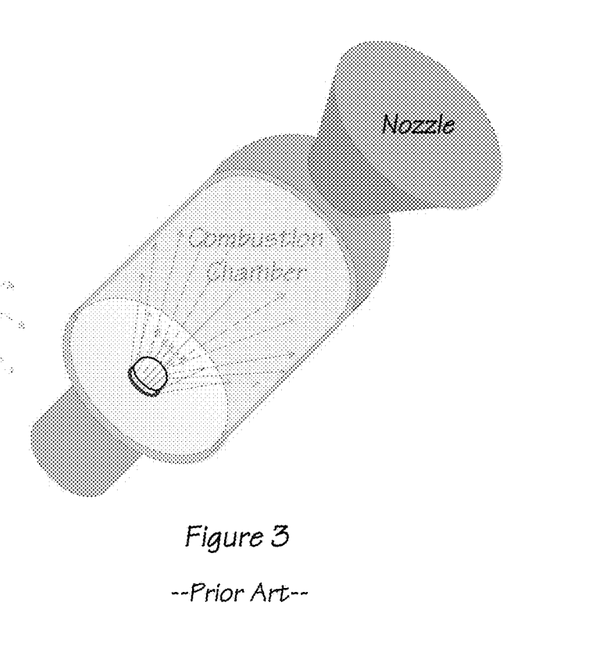
FIG. 3 is a simplified orthographic view of the conical spray produced by a pintle injector with the fuel spray impinging on the oxidizer spray within a cutaway view of a rocket engine combustion chamber.

The pintle injector, developed in the mid 1950's, is fundamentally different from the shower spray type injectors described above. Anyone who uses a garden hose has probably used a pintle spray nozzle at one time or another. The design described in this patent relies on the impingement of both the oxidizer and the fuel to produce the final spray pattern. FIG. 1 illustrates how the spray pattern of the pintle with fuel flow alone would be a cylindrical spray formed concentrically around the injector and flowing straight away from the pintle along its axis. FIG. 2 illustrates how the spray pattern of the pintle with just the oxidizer flow would be a flat spray perpendicular to the axis of the pintle flowing straight away from the pintle on all sides. The collision, or impinging of the fuel from behind on the oxidizer flow would produce a conical pattern concentric with the pintle equal to the sum of the mass flow vectors of both flows, illustrated by FIG. 3.

As such, the pintle has a central and conical injection geometry resulting in a combustion chamber flow field that varies greatly from that of conventional rocket engines and these differences result in the following advantages:

High Performance—The pintle nozzle allows a continuous variation of the injector mass flow while maintaining an effective spray of atomized mixed fuel and oxidizer droplets, thus, providing optimum expansion area ratios throughout the entire rocket flight regime. Additionally, the axial-radial impingement of the two propellant streams combined with the specific geometry of the resulting atomization and conical mixing spray is fundamental to the pintle injector providing high combustion efficiency (typically 96-99%).

Scalability—Historically, the basic pintle injector has been demonstrated to be scalable over a wide range of mass flow applications.

Inherent Combustion Stability—The recirculating flow fields within the combustion chamber provide the inherent combustion stability of the pintle injector.

Propellant Flexibility—Pintle injector operation has been demonstrated with 25 different combinations of propellants.

Deep Throttling—Pintle injectors have operated over throttle ranges as high as 35:1 while retaining high combustion efficiency. The pintle injector subject to this patent uses a movable sleeve and a separate on-axis (coaxial) support rod (or tube) and cruciform guide vanes are used to support the pintle tip independent of the sleeve. It has been repeatedly demonstrated that movement of a single sleeve of this type can simultaneously meter both the fuel and the oxidizer at their immediate points of injection to provide engine throttling. With proper design the sleeve can be made to fully shutoff both propellants at the injector face (referred to as "face shutoff"), thereby eliminating all dribble volume from the injector.

Simplicity—With few critical parts and the utilization of additive manufacturing, significantly lower development and qualification costs can be realized because pintle injectors can be easily modified and optimized by altering only two simple parts. A complete pintle injector can be made with as few as five parts, excluding the engine combustion chamber headend and fasteners. The simple design of pintle injector parts and their operation at benign temperatures (except for the pintle tip) assures ease of manufacturing using non-exotic metal alloys. The engine combustion chamber is simplified because the inherent combustion stability provided by the pintle injector eliminates the need for any headend baffles or acoustic cavities usually needed to dampen acoustic resonance for other types of injectors. Additionally, if fuel is chosen as the central propellant in radiation-cooled engines, the radial injection momentum of the fuel can be designed to persist to the wall, thus enabling a convenient means of providing fuel film cooling of the combustion chamber. All of these factors enhance reliability and reduce manufacturing costs of a rocket engine. In the case of the face shutoff only (FSO) injector, the large bipropellant valve normally required in such engines is replaced by a small pilot valve that can use high pressure fuel or hydraulic fluid to actuate the moveable injector sleeve. This feature greatly improves overall thruster response and significantly reduces engine size and mass.

Design Adaptability—The pintle injector design can include features such as deep throttling, rapid pulsing, face shutoff with upstream valve control, face shutoff only (FSO) without the need for upstream valves, various internal enhancements to further adjust or improve combustion, direct injection of near-normal boiling point LH2, and the demonstrated ability to use gelled propellants in pulsing applications.

Low Cost—Simplicity and ease of pintle manufacture provides for significant reductions in recurring costs making them ideal for use on low cost engines. With inherent stability and ease of optimization, the pintle injector minimizes risk and cost for development and qualification of new engine designs.

Used by JPL in the mid-1950's, to study propellant mixing and combustion reaction times of hypergolic liquid propellants, the pintle injector was made practical and developed by TRW starting in 1960. However, the pintle injector design patent was not publicly released until 1972 (Gerry Elverum, U.S. Pat. No. 3,699,772). In over 40 years, TRW developed and tested greater than 60 different iterations of pintle engine designs for a variety of applications and fuels including the man-rated Apollo Lunar Excursion Module Descent Engine (LEMDE), which provided 10:1 throttling capability to perform lunar landings, and the largest, the 650,000 lbf LOX/LH2 Low Cost Pintle Engine (LCPE) for booster propulsion.

During this time improvements to the basic pintle design, including tips to the spiral support vanes to provide a radial swirl, and small slots in the flow control sleeve edge (Gerry Elverum, U.S. Pat. No. 4,206,594) to create separate radial small jets, or spokes, rather than sheets of spray. Both of these improvements have been shown to enhance injector fuel/oxidizer mixing by increasing shear impact of fuel/oxidizer droplets. However, in pintles where the control sleeve was perforated with slots, full face shutoff was precluded.

As an alternative, this patent incorporates a modification to the pintle head and flow control sleeve of a typical pintle that both provides the benefit of the more efficient radial spoke jet spray of oxidizer/fuel mix while preserving the ability of the flow control sleeve and pintle head to create a seal to allow full face shutoff.

In addition, this patent describes a novel approach to the integration of an axial igniter into the fuel/oxidizer pintle injector nozzle, which achieves the goal of providing a rocket engine that is extremely throttleable and can be reignited during flight with stable combustion from ignition to steady state operation regardless of environmental conditions. Increased initial ignition efficiency and low-frequency stability can be achieved across all power levels by ensuring uniformity of the flame front and a combustion recirculation pattern through symmetrical hot gas ignition from inside and concentric with the injector fuel/oxidizer spray provided by the pintle.

An improved pintle head and flow control sleeve provides both a more efficient radial spoke jet spray of oxidizer/fuel mix while preserving the ability of the flow control sleeve and pintle head to create a seal to allow full face shutoff. The flow control sleeve extends the exterior aft length of the pintle shaft and is extended or retracted to control the flow of both fuel and oxidizer out of the pintle. In this design, when the flow control sleeve is in the open positions, vanes added both behind the pintle head create separate spokes of oxidizer jets and vanes added to the outside of the flow control sleeve provide corresponding impinging jets of fuel to create a maximally efficient fan of fuel/oxidizer mixed droplets. When the flow control sleeve is in the closed position, the leading aft edge of the sleeve is able to seal against the front edge of the pintle head to allow complete shutoff of the flow.

The advantages of this design is that the vanes inside the separate fuel and oxidizer near the exit orifices provide the spokes of jet flow for the full range of control sleeve travel and, therefore does not interfere with the full range of throttle positions and the ability to provide full face shut off. Previous designs using slots in the flow control sleeve to produce the spokes of oxidizer flow precluded the ability to use the flow control sleeve to make a seal with the pintle head to provide full face shutoff and did not provide the lowest possible throttle positions had there not been slots.

An improved injector/ignition system has a divided impinging spray pintle injector with a central and retractable concentric igniter. The igniter extends the length of the injector body with seals for both heat protection and containment of hydraulic fluid as required. Either hydraulic or electromechanical actuators push the igniter forward and aft through the center of the pintle body. When in the deployed position, the spark igniter produces symmetrical jets of hot gas radiating from the centerline of the pintle injector to ignite the surrounding spray of fuel/oxidizer mixture. Once ignition has been accomplished, the igniter is retracted so that the tip of the injector and pintle tip conform to provide heat protection for the entire mechanism.

The advantages of this design are improved combustion of a symmetrical flame front within the combustion chamber enhancing the efficiency of the ignition process and reducing the possibility of low frequency combustion oscillations encountered using other ignition methods with pintles. Additionally, through the use of additive manufacturing, this entire device can be reduced to a few parts with complex shapes and multiple functionalities not possible through conventional manufacturing techniques. Still further advantages and possible adaptations will become apparent from a study of the following description and the accompanying drawings. The accompanying drawings are not to scale and the device depicted is not topologically or structurally optimized for additive manufacturing. This patent is intended to describe a general device for concentric ignition in radial pintle injector with advanced spray features and is not specific to any structural constraints or exact device topology possible with additive, subtractive, or cast production methods.

Field of the Invention

Integrated fuel system igniter for a rocket engine combustion chamber.

Description of Related Art Including Information Disclosed Under 37 CFR 1.97 and 1.98

BRIEF SUMMARY OF THE INVENTION

This patent describes a novel approach to the integration of the spark torch igniter into the fuel/oxidizer pintle injector nozzle and adaptation of the pintle flow to achieve the goal of providing a restartable/reignitable rocket engine that is extremely throttleable with stable combustion from ignition to steady state operation regardless of environmental conditions. Increased initial ignition efficiency and low-frequency stability can be achieved across all power levels by ensuring uniformity of the flame front and a combustion recirculation pattern through symmetrical hot gas ignition from inside and concentric with the injector fuel/oxidizer spray provided by the pintle.

BRIEF DESCRIPTION OF THE SEVERAL VIEWS OF THE INVENTION

DETAILED DESCRIPTION OF THE INVENTION

Figure 4:
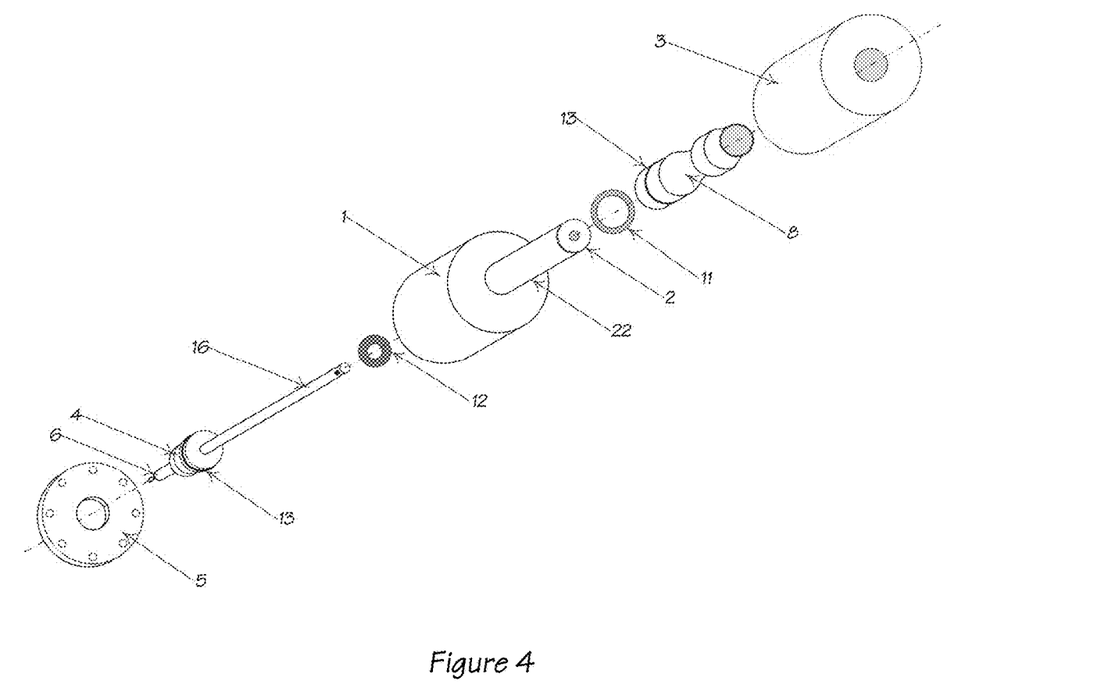
FIG. 4 is an orthographic projection of the exploded view of the main parts of this device.

FIG. 4 is an orthographic projection of the exploded view of the main parts of this device. The aft housing of the aft pintle body casing (3), with internal channels for the fuel, holds the sliding injector flow control sleeve (8), seal (13), and spring (11). The forward pintle casing (1) with the protruding pintle head (2) holds the fixed aft outer pintle sleeve (22) and has the internal channels for the hydraulic fluid, and oxidizer. The sliding spark torch igniter core (4) with seal (13), igniter tube (16) and spring (12) are inserted into the forward pintle casing. The sliding injector flow control sleeve (8) is free to slide forward and aft on the fixed aft outer pintle sleeve (22) within the aft pintle body casing (3) and is held under spring tension by the aft face of the forward pintle casing (1). The igniter (4) is free to slide inside the forward pintle casing (1) and is held under spring tension by the forward endcap (5). A set of bolts pass through the endcap, forward injector body, and into aft injector body to secure the assembly into one unit (not shown).

Each of the five major modules of this device [the aft pintle body casing (3), injector flow control sleeve (8), The forward pintle casing (1), spark torch igniter (4 and 16), and forward endcap (5)] may be manufactured as single parts using additive manufacturing. This process will require little or no additional machining to include the complex internal channels for hydraulic control fluid, oxidizer, fuel, or cooling.

Figure 5:
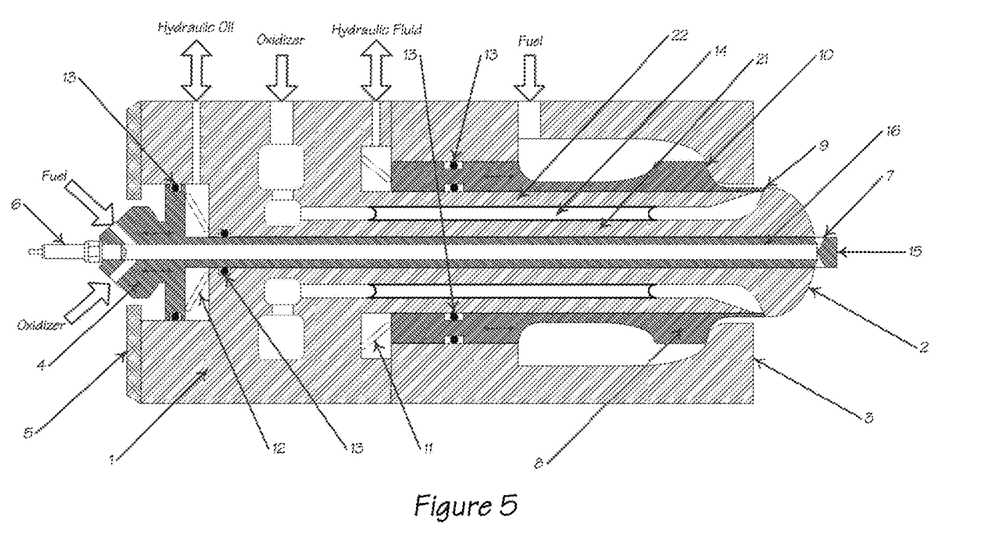
FIG. 5 is a cross section example of the entire pintle injector with internal igniter and endcap flow diverter.

FIG. 5 is a lengthwise cross section example of the entire pintle injector with internal igniter illustrating the legacy features in harmony with the concentric igniter (4), igniter tube (16), and extended igniter tube endcap. The concentric injector flow control sleeve (8), housed in the injector aft pintle casing, is designed to be movable and slide forward and backward on the outer pintle sleeve. When fully forward it contacts both the inner surface of the injector body (10) to stop the flow of fuel and contacts the rear surface of the fixed pintle (9) to stop the flow of oxidizer. When slid backward by the suction of hydraulic fluid, the springs (11) are compressed and the injector sleeve opens both the fuel flow and the oxidizer flow proportional to the desire mix. This provides a useful and consistent way of throttling the injector to maintain nearly constant injection velocities across a wide range of injected propellant mass flow rates.

As an alternative configuration, the injector flow control sleeve can be redesigned with an additional flange employing the spring on the other side so that hydraulic pressure is used to move the sleeve forward and aft and the injector would instead fail in the open position should a loss of hydraulic pressure occur. Additionally, an electromechanical servo may be used to control the motion of the flow control sleeve as an alternative to hydraulics.

As an additional feature, to enhance mixing of the oxidizer and fuel spray droplets, the oxidizer is passed through a concentric and symmetric set of spiral vanes (14), which surround and support the inner pintle shaft (21) to impart a rotational angular momentum to the oxidizer spray as it leaves the pintle oxidizer port (9).

Central and concentric to the inner pintle shaft (21) and injector body core (1 and 3) is the spark torch injector tube (16) and head (4). When the igniter is extended toward the aft end of the injector (3), the igniter ports (7) extend past the pintle head (2) and are open to the combustion chamber so that hot gases from the igniter are projected perpendicularly to the injector axis into the surrounding fuel-oxidizer mix to ignite the mixture. When retracted, the igniter endcap (15) forms a conformal surface with the face pintle head (2) to protect the internal igniter and pintle parts from the heat of the combustion chamber. The hot gases in the ignitor are produced by the flow of fuel and oxidizer mixing over the surface of a spark plug (6) centered in the end of the igniter head (4).

Figure 6:
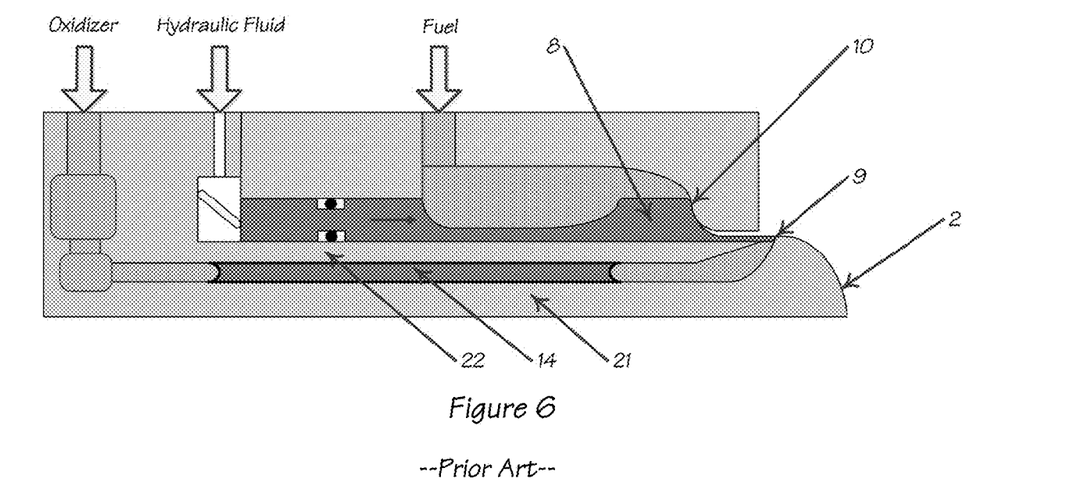
FIG. 6 is a partial cross section example of the one side of the pintle injector with the sliding flow control sleeve in the closed position with fuel and oxidizer flow shut off.

FIG. 6 is a cross section of the upper portion of the legacy pintle module illustrating the concentric injector sleeve (8) in the shutoff position. Fuel flow is stopped when the injector sleeve (8) contacts the injector body (10) and the oxidizer flow is also stopped when the injector sleeve (8) simultaneously also contacts the fixed pintle (9).

Figure 7:
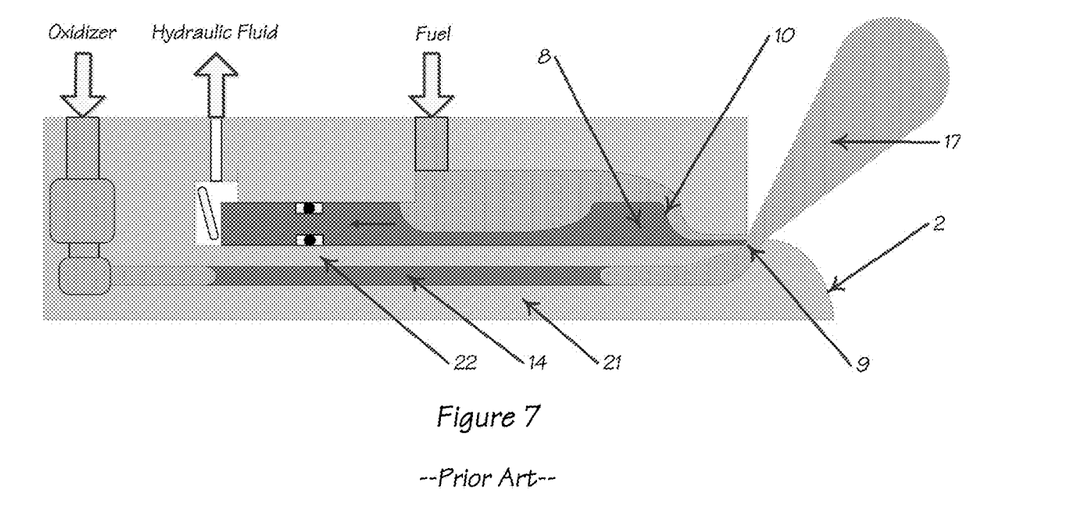
FIG. 7 is a partial cross section example of the one side of the pintle injector with the sliding flow control sleeve in the open position with fuel and oxidizer mixture spraying at an angle from the injector centerline.

FIG. 7 is a cross section of the upper portion of the legacy pintle module illustrating the concentric injector flow control sleeve (8) is retracted to the fully open position. Fuel flows when the injector flow control sleeve (8) creates a path with the injector body (10) and the oxidizer flows when the injector flow control sleeve (8) simultaneously creates a path with the fixed pintle (9). The curve of the inner pintle shaft (21) and injector flow control sleeve (8) are designed so that the movement of the injector sleeve maintains the required proportional flow of the fuel and the oxidizer. The impinging of the fuel flow and the oxidizer provide a mixed vapor (17) flow of the two components at an angle proportional to the two individual flows. Spiral support vanes (14) are used to add a rotational component to the oxidizer flow having the effect of improving the vapor mixture (17).

In addition to internal igniter, the device described in this patent (illustrated in FIGS. 8A-D) will further enhance combustion efficiency while permitting full face shut off. Small vanes (24) in front (23) of the pintle head (2) to separate the exit flow will create separate small jest, or spokes of oxidizer, which will impinge on the exit jets of fuel from similar, harmonized small vanes to the outside side of the flow control sleeve (illustrated in FIGS. 9A-C).

Figure 8A:
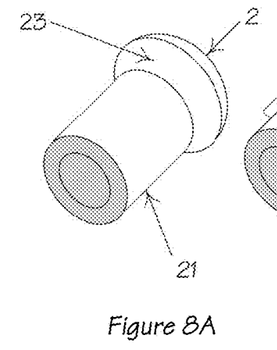
FIG. 8A is an orthographic cutaway view of the pintle head illustrating the pintle shaft and the forward face of the pintle head.
Figures 8B, 8C:
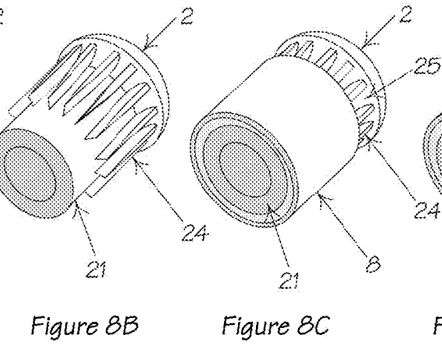
FIG. 8B is an orthographic cutaway view of the pintle head illustrating the location of optional pintle shaft oxidizer vanes located on the pintle shaft.
FIG. 8C is an orthographic cutaway view of the pintle head illustrating the surrounding flow control sleeve in the open position creating a channel for the flow of oxidizer.
Figure 8D:
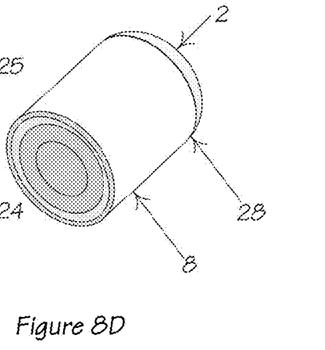
FIG. 8D is an orthographic cutaway view of the pintle head illustrating the surrounding flow control sleeve in the closed position creating a contact seal between the flow control sleeve and the forward face of the pintle head.

FIG. 8A illustrates the pintle shaft (21) and the pintle head (2) from conventional pintles of this type. FIG. 8B illustrates the radial vanes (24) added to the pintle shaft arranged in front of the pintle head (2). FIG. 8C illustrates the pintle shaft (21) and vanes (24) inside the flow control sleeve (8), which creates a set of oxidizer ports (25) directing separate jets, or spokes of oxidizer radially out from the pintle centerline. FIG. 8D illustrates the flow control sleeve (8) in the aft or closed position to provide a seal (28) between the forward edge of the control sleeve (8) and the edge of the aft face of the pintle head (2). The vanes are constructed to slide tightly against the inside of the flow control sleeve to provide efficient channels for the flow of oxidizer.

Figure 9A:
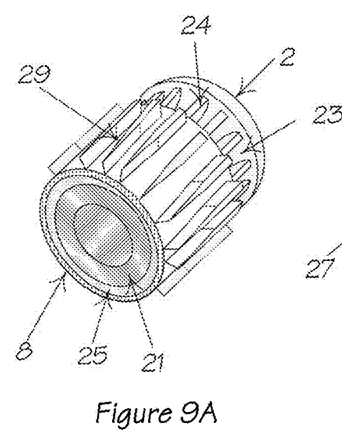
FIG. 9A is an orthographic cutaway view the radial vanes on the outside of the flow control sleeve, an orthographic view of the flow control sleeve, pintle shaft, and their vanes inside a cutaway of the inside of the aft section of the pintle housing, with the outer sleeve created by the pintle body and a cross sectional end view of the internal oxidizer channels created within the assembly.
Figure 9B:
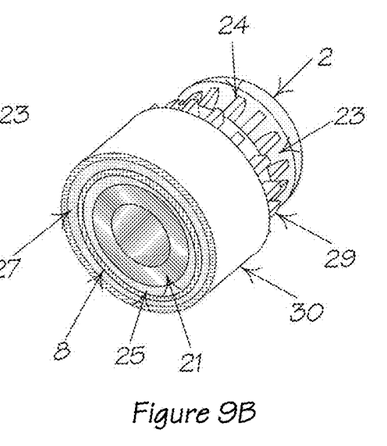
FIG. 9B is an orthographic view the radial vanes on the outside of the flow control sleeve, an orthographic view of the flow control sleeve, pintle shaft, and their vanes inside a cutaway of the inside of the aft section of the pintle housing, and a cross sectional end view of the internal oxidizer channels and the fuel channels created within the assembly.
Figure 9C:
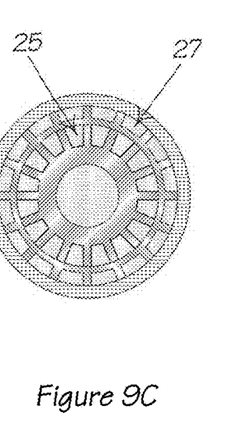
FIG. 9C is a cross sectional view the radial vanes on the outside of the flow control sleeve, pintle shaft, and their vane enclosed in the aft section of the pintle housing illustrating the end view of the internal oxidizer channels and the fuel channels created within the assembly.

FIG. 9A illustrates the radial vanes (29) on the outside of the flow control sleeve (8). FIG. 9B illustrates the flow control sleeve (8), pintle shaft (21), and their vanes (24 and 29) inside a cutaway of the inside of the aft section of the aft pintle housing (3) creating a cylindrical set of fuel jets parallel to the pintle centerline. These fuel jets will impinge on the radial jets of oxidizer leaving the inner oxidizer ports (25). FIG. 9C illustrates the cross sectional end view of the internal oxidizer channels (25) and the fuel channels (27) created within the assembly. Proper alignment of the vanes ensures the effective impingement of the cylindrical fuel jets on the radial oxidizer jets to provide a highly mixed conical jet of both components. As an optional configuration, the fuel flow vanes could be arranged radially on the interior of the injector aft body channel rather than on the fuel control sleeve to have the same effect (as illustrated in FIGS. 10A-E). Similarly, the vanes on the flow control sleeve are constructed to slide tightly against the inside of the aft pintle body to provide efficient channels for the flow of fuel. To summarize FIG. 9, The flow control sleeve is free to slide forward and aft between the fixed pintle body and the fixed pintle shaft. This arrangement of vanes (24 and 29) creates a dual spray pattern of smaller jets from channels (25 and 27) to enhance mixing of fuel/oxidizer droplets in the same manner as the slots used in previous designs while preserving the lip behind the pintle head (2) to which the aft edge of control sleeve (8) can still seal (28) against the pintle head (2) when in the closed position (FIG. 8D) to provide full face shutoff.

Figure 10A:
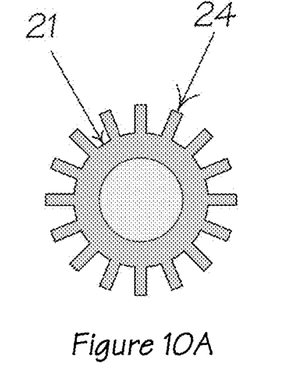
FIG. 10A is a cross sectional view of the pintle shaft with vanes.
Figure 10B:
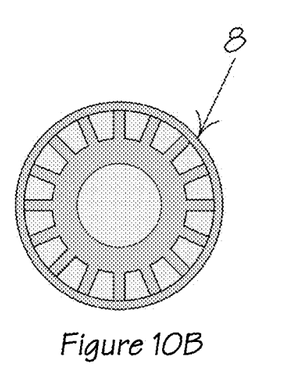
FIG. 10B is a cross sectional view of the pintle shaft with vanes inside the fuel injector flow control sleeve with vanes.
Figure 10C:
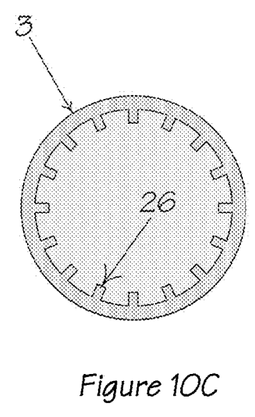
FIG. 10C is a cross sectional view of the aft pintle casing with internal vanes.
Figure 10D:
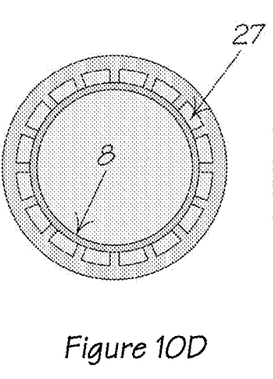
FIG. 10D is a cross sectional view of the aft pintle casing with internal vanes surrounding the fuel injector flow control sleeve.
Figure 10E:
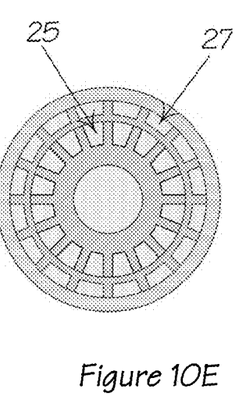
FIG. 10E is a cross sectional view of the buildup of the alternate assembly of the pintle shaft, the pintle housing without vanes, and the aft section of the pintle housing with vanes providing both fuel and oxidizer channels.

FIGS. 10A-D, illustrate an alternative arrangement of the flow control sleeve (8) and aft pintle body (3), where the flow control sleeve is smooth on both sides and the aft pintle body has the coordinated vanes (26). FIG. 10A illustrates the cross section of the pintle shaft and vanes just forward of the pintle head. FIG. 10B illustrates the oxidizer channels created by the pintle shaft and vanes inside the smooth flow control sleeve (8). FIG. 10C illustrates the cross section of the aft pintle body (3) with vanes (26) on the inside surface. FIG. 10D illustrates the cross section of the fuel channels (27) created by the flow control sleeve (8) inside the aft pintle body. FIG. 10E illustrates the cross section of the oxidizer channels (25) and coordinated fuel channels (27) created when all three parts (the pintle aft body, the flow control sleeve, and the pintle shaft) are assembled. The flow control sleeve is free to slide forward and aft between the fixed pintle body and the fixed pintle shaft.

Figure 11:
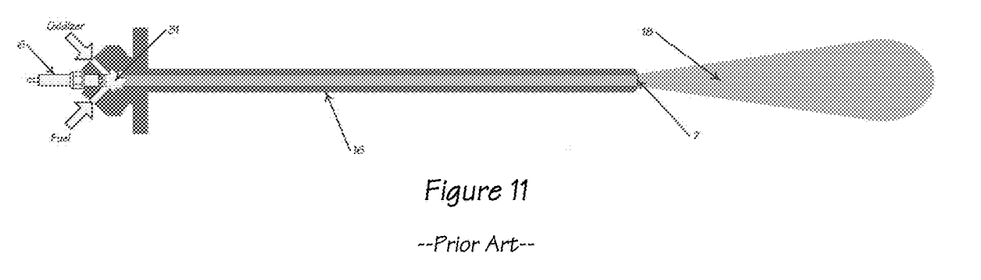
FIG. 11 is a side cutaway view of the ignitor illustrating a typical ignitor with a single jet of hot gas radiating axially from the tip of the injector tube.

In addition to the pintle injector improvement, this patent incorporates a retractable coaxial igniter. For illustration purposes a spark torch igniter is provided. This concept would be applicable to any type of igniter capable of projecting a spark or jet of gasified propellants through the center of the pintle and into the combustion chamber with enough intensity to ignite the fuel/oxidizer mixture spray. As an example, the typical torch igniter concept starts with an electrical spark from device similar to an automobile spark plug (6) in FIG. 11. Oxidizer and fuel are passed over the spark causing the gasified propellants to ignite (31) and form a flame. That flame (18) is then directed into the combustion chamber through a tube (16) and out an orifice (7) just as the main propellant flow is passing out of the injector. In this way, the spark torch igniter uses the same gaseous propellants of the rocket engine burning cleanly to ignite the fuel mixture and produce limited to no additional particles into the combustion gases.

Figure 12:
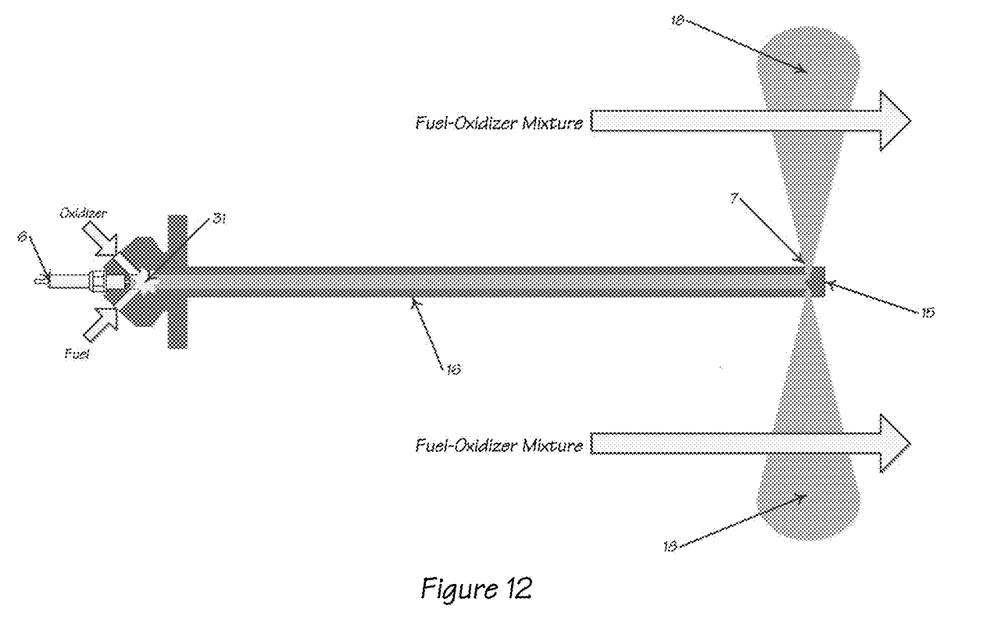
FIG. 12 is a side cutaway view of the ignitor illustrating the cruciform jets of hot gas radiating from the tip of the injector tube.

In the case of this patent, as illustrated in FIG. 12, the igniter tube has been modified so that the end is blocked by an endcap (15) and orifices are provided in the side of the tube (7) to provide jets of hot gas (18) ejected out the sides of the tube (16) into the fuel-oxidizer mixture that will be flowing concentrically outside the injector tube.

This radial spoke igniter modification would apply to any form of igniter working with similar hot gas jet or spark principles.

Figure 13:
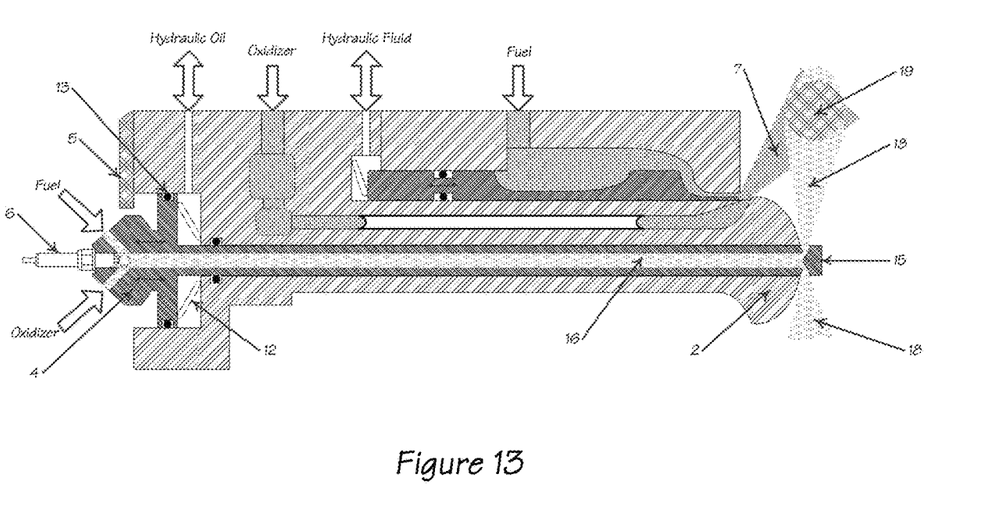
FIG. 13 is a partial cross section example of the one side of the pintle injector showing the central igniter in the deployed position with the hot gases radiating out from the pintle centerline to intersect and ignite the fuel and oxidizer mixture spraying at an angle from the injector centerline.

FIG. 13 is a cutaway of the upper portion of the pintle assembly showing the central, enhanced spark torch igniter (4) in the extended position used to ignite the concentric fuel/oxidizer vapor (7). The fuel and oxidizer impinge on the spark plug (6) to ignite and cause hot gas to flow down the injector tube (16) and flow out (18) of the radial orifices created by the end plug (15) and contact the fuel/oxygen spray (D and ignite at the intersection (19).

Figure 14:
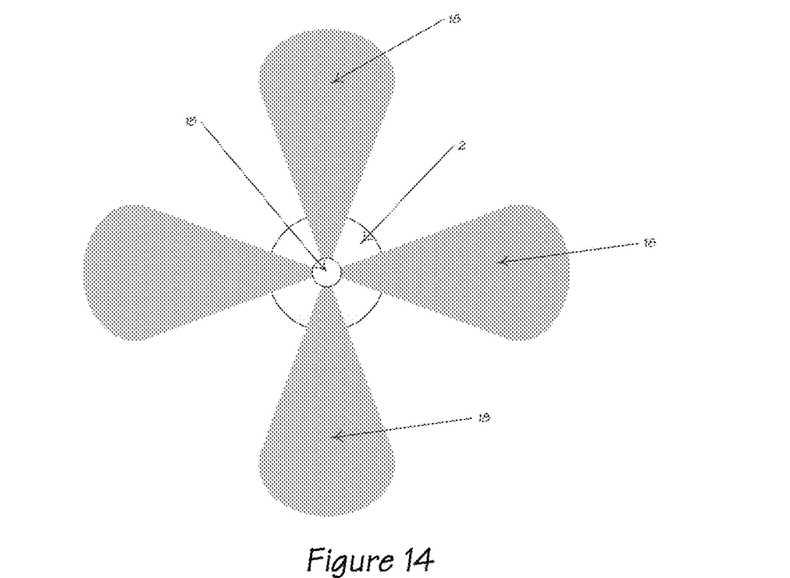
FIG. 14 is an end view of the enhanced igniter head in the deployed position on the pintle head with a cruciform hot gas ejection.

FIG. 14 is an end view of the enhanced igniter endcap (15) in the deployed position on the pintle head (2) with a cruciform hot gas ejection (18). As an alternative, two or more igniter ports symmetrically spaced around the end of the igniter tube may be used as necessary to provide equally distributed hot gas jets to ignite the concentric cone of fuel/oxidizer spray ejected by the pintle.

Figure 15:
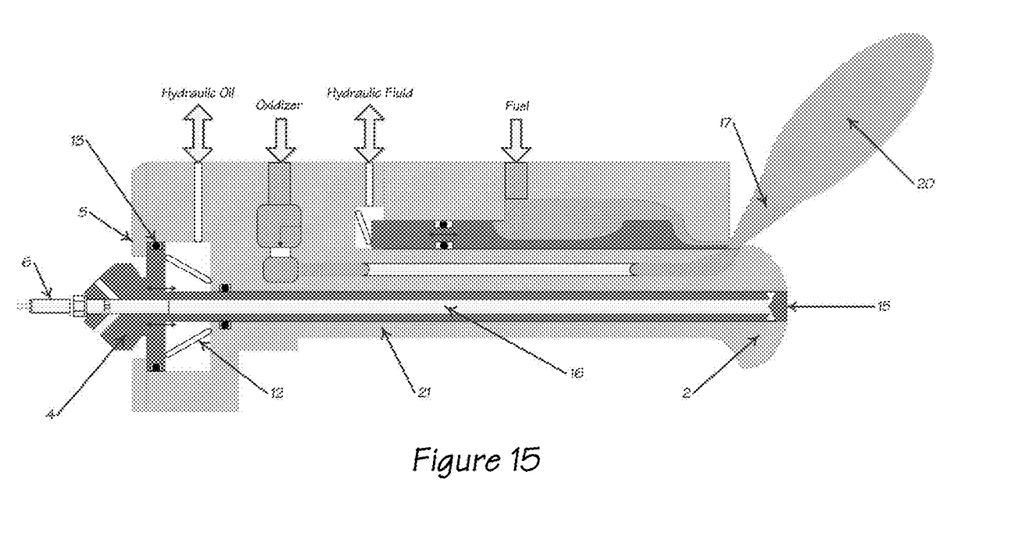
FIG. 15 is a cutaway of the upper pintle body with the central igniter in the retracted position with steady state concentric fuel/oxidizer flow flame front after ignition.

FIG. 15 is a cutaway of the upper portion of the pintle assembly showing the central igniter (4) in the retracted position with steady state concentric fuel/oxidizer flow (17) and flame front (20) after ignition. The flange of the spark torch igniter body rests on the forward pintle endcap (5) attached to forward end of the pintle body and is held there by the springs (12). This version of the design uses the hydraulic suction to pull against the springs to move the igniter to the deployed position and, should hydraulic pressure be lost, will fail with the igniter in the fully retracted position.

As an alternative configuration, the springs (12) could be placed on the forward face of the flange between the forward endcap (5) and the forward face of the flange so that positive hydraulic pressure is used to move the igniter forward and the injector would instead fail in the deployed position should a loss of hydraulic pressure occur.

To further simplify the rocket engine design, instead of employing a separate conventional hydraulic control system with hydraulic oil, high-pressure fuel flow may be used as a control medium for both the injector control sleeve and the igniter unit.

Additionally, an electromechanical servo may be used to control the motion of the igniter as an alternative to hydraulics.

REFERENCE NUMERALS 1 forward pintle casing
2 pintle head
3 aft pintle casing
4 spark torch igniter head
5 forward pintle endcap
6 igniter spark plug
7 igniter tube orifice
8 injector flow control sleeve
9 oxidizer injection orifice flow control surface
10 fuel injection orifice flow control point
11 injector flow control sleeve spring
12 igniter spring
13 igniter and injector flow control sleeve seals
14 oxidizer pintle support vane
15 igniter tube endcap
16 igniter tube
17 fuel/oxidizer vapor
18 igniter hot gas ejection
19 hot gas fuel/oxidizer ignition intersection
20 fuel/oxidizer flame front
21 inner pintle shaft
22 outer pintle sleeve
23 forward face of pintle head
24 pintle shaft oxidizer vanes
25 oxidizer channel
26 alternative inner vanes on inside of aft pintle body
27 fuel channel
28 contact seal of the aft edge of the flow control sleeve and the forward face of the pintle head
29 flow control shaft fuel vanes
30 cutaway of aft pintle body
31 ignitor gas ignition point

The invention claimed is:

1. An integrated pintle and igniter comprising:
an injector body which provides a structure subsuming a pintle comprising an outer pintle injector shaft and inner pintle shaft and the pintle is mounted to a forward end of a rocket engine combustion chamber,
a concentrically mounted, hydraulically or electromechanically controlled injector sleeve around an outside of the outer pintle injector shaft within an aft portion of the injector body,
spray dividing vanes radially mounted along the inner pintle shaft abutting a pintle head and coordinated spray dividing vanes radially mounted along an interior of a fuel channel at an exit, and
a coaxially mounted, hydraulically or electromechanically deployable, spark torch igniter assembly within the inner pintle injector shaft with multiple ports in an igniter tube endcap capable of radially projecting hot ignition gases into a pintle fuel/oxidizer spray when deployed,
wherein the igniter tube endcap of an igniter tube acts as a heat shield and control valve when the coaxially mounted, hydraulically or electromechanically deployable, spark torch igniter assembly is retracted,
wherein the concentrically mounted, hydraulically or electromechanically controlled injector sleeve around the outside of the outer pintle injector shaft is placed in an open position to allow flow of the pintle fuel/oxidizer spray into the rocket engine combustion chamber,
wherein, as the pintle fuel/oxidizer spray begins to flow into the rocket engine combustion chamber, the coaxially mounted, hydraulically or electromechanically deployable, spark torch igniter assembly is hydraulically or electromechanically placed in a deployed position and ignited to inject the hot ignition gas into the pintle fuel/oxidizer spray,
wherein, once the pintle fuel/oxidizer spray has been ignited, the coaxially mounted, hydraulically or electromechanically deployable, spark torch igniter assembly is placed in a retracted position so that a tip of the igniter tube endcap conforms with the pintle head, and wherein the concentrically mounted, hydraulically or electromechanically controlled injector sleeve is moved back and forth to throttle and shut off the rocket engine combustion chamber.

* * * * *